Dec. 26, 1967     E. H. PROULX     3,360,133
FILTER CARTRIDGE
Filed Sept. 3, 1965
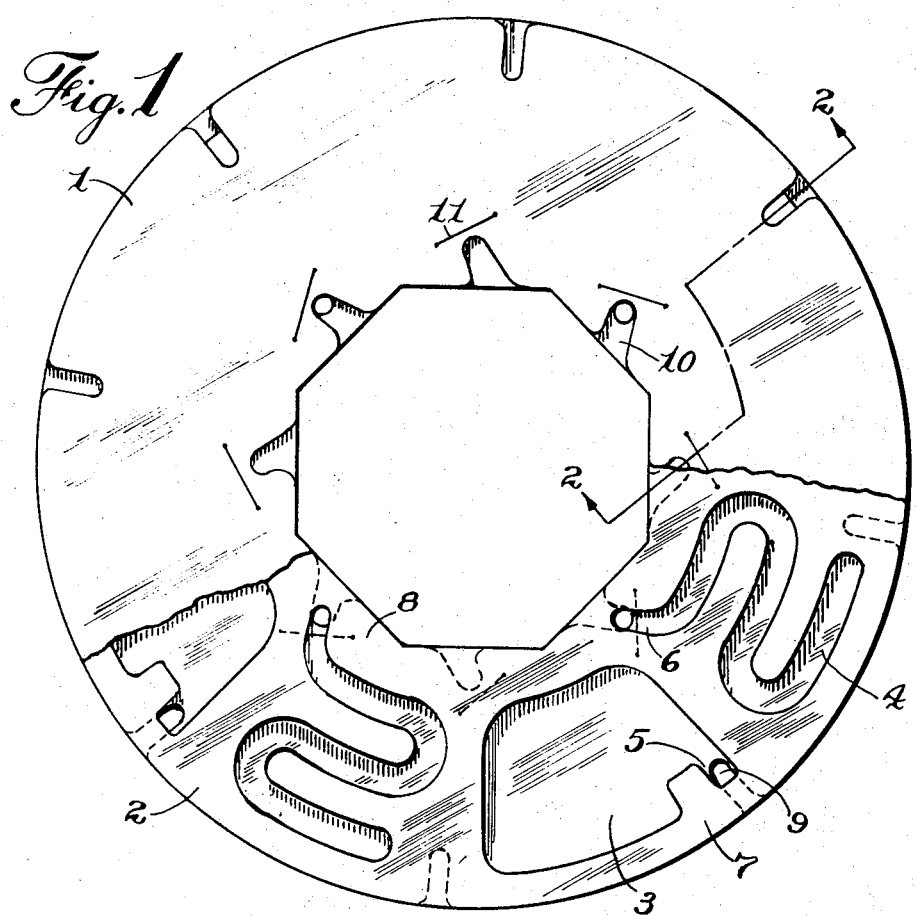
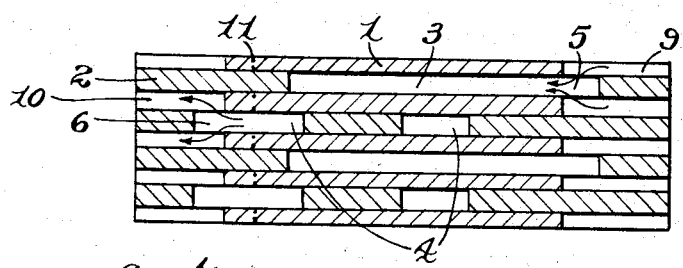
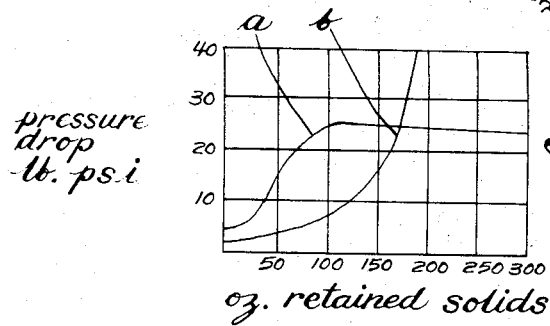
INVENTOR.
Eugene H. Proulx
BY
Clinton L. Janes
ATTORNEY

United States Patent Office 3,360,133
Patented Dec. 26, 1967

3,360,133
FILTER CARTRIDGE
Eugene H. Proulx, Elmira, N.Y., assignor to The Hilliard Corporation, Elmira, N.Y., a corporation of New York
Filed Sept. 3, 1965, Ser. No. 485,055
5 Claims. (Cl. 210—492)

ABSTRACT OF THE DISCLOSURE

An oil filter cartridge comprising filter discs and separator discs stacked alternately, the separator discs having inlet and outlet cells and passages walled in by the contiguous filter discs, the filter discs having ports registering with the inlet and outlet passages, and having stiffening inserts to prevent the formation of by-pass channels between contiguous discs allowing the passage of unfiltered oil through the cartridge.

---

The present invention relates to a filter cartridge for removing suspended solid particles from contaminated or turbid fluids and more particularly to that type of cartridge which comprises a plurality of filter discs or annuli of foraminous material interleaved with spacing annuli or discs providing inlet and outlet chambers or cells for the fluid to be clarified.

This invention is an improvement on the structure shown in applicant's Patent 2,687,805 issued Aug. 31, 1954, reference to which is made for a disclosure of the complete filter structure, for the sake of brevity.

Filter cartridges of the type disclosed in applicant's patent, above cited, have been found to be eminently satisfactory in commercial use as long as the recommended service life of the unit is reasonably adhered to. However, if the unit is allowed to remain in service after it has become so loaded with entrained solid material that the resistance to flow of the liquid to be clarified substantially exceeds the recommended maximum pressure differential, it has been found that there is a tendency for the incoming fluid to channel its way out from the inlet chamber by forcing portions of the filter discs, which overlie the outlet passages of the spacer discs, downward into said passages. This permits some of the fluid to escape through the channels thus formed, by-passing the filter discs, and carrying with it more or less of the solid material suspended in the fluid.

It is an object of the present invention to provide a novel filter cartridge which is economical in construction, the units of which are resistant to distortion during assembly and use, and which retains the effectiveness of its filtering action during prolonged use.

It is a further and more specific object of this invention to prevent the above described channeling action and consequent escape of solid matter into the filtrate, even though the cartridge is inadvertently not replaced immediately when the recommended maximum intake pressure is reached.

It is another object to so construct and reinforce the discs that it is possible to use softer and more loosely reticulated material for the discs than has hitherto been considered necessary for mechanical strength and resistance to deformation, thereby correspondingly increasing the filtering capacity of the cartridge.

Further objects and advantages will be apparent from the following description taken in connection with the accompanying drawing, in which:

FIG. 1 is a plan view of a portion of a cartridge constructed in accordance with the present invention, portions of the upper layer being broken away to show the interior construction;

FIG. 2 is a vertical section on an enlarged scale taken substantially on the broken line 2—2 of FIG. 1; and FIG. 3 is a chart showing graphically the increased filtering capacity secured by applicant's improved structure.

In FIGS. 1 and 2 there is illustrated a series of filter discs or annuli 1 of suitable foraminous material between each of which are intercalated separator discs 2. The separator discs are preferably also made of foraminous material in order that they may supplement to some extent the filtering action of the filter discs while performing their primary function of providing inlet and outlet cells.

As shown in FIG. 1 the discs are substantially circular in conformation, with octagonal central openings so that the assembled cartridge takes the form of a cylinder with an axial octagonal passage for reception of an octagonal tubular assembly fixture.

The separator discs 2 are provided with circumferentially arranged cut-out portions 3, 4 which, in conjunction with the walls of the adjacent filter discs form cells or chambers in the assembled cartridge, inlet cells 3 being roughly of trapezoidal conformation, while the outlet cells 4 are of sinusoidal form, as shown in FIG. 1.

As here shown there are four inlet cells and four outlet cells spaced alternately around each separator disc. During assembly of the cartridge the successive separator discs are rotarily displaced 45 degrees with respect to each other. This causes the inlet and outlet cells to be superimposed alternately over each other axially of the assembled cartridge, with the filter discs interposed therebetween.

The inlet cells 3 are provided with inlet passages 5 and the outlet cells 4 are provided with outlet passages 6, but it will be noted that both the inlet and outlet passages terminate a substantial distance from the adjacent outer and inner peripheries of the discs so as to leave solid annular walls 7, 8 terminating said passages and enclosing said cells.

The present structure is arranged for the direction of flow through the cartridge to be inward from the exterior, in accordance with common practice, the clarified fluid being conducted from the interior of the cartridge in the conventional manner.

In order to permit entry of the fluid from the exterior of the cartridge into the inlet cells 3, the filter discs 1, are provided with peripheral ports 9 which register with the inlet passages 5 of the inlet cells 3, and which are open to the exterior of the cartridge. Similarly, in order to provide egress from the outlet cells 4 the inner peripheries of the filter discs 1 are provided with outlet ports 10 which register with the outlet passages 6 of the outlet cells 4 and are open to the interior of the cartridge.

In order to prevent the pressure in the intake cells 3 from forcing the portions of the filter discs which overlie the outlet passages 6 of the outlet cells 4 down into said passages, said portions are reinforced and stiffened. As here shown, this is accomplished by means of staples 11 of wire or other suitable material which are inserted in position to bridge said outlet passages and compress and clinch the material of the filter discs at the critical areas. The escape of turbid fluid from the intake cells into the outlet ports 10 by the channeling action above referred to is thus effectively prevented.

In operation, the turbid fluid which surrounds the cartridge is permitted to enter the inlet cells 3 through the ports 9 in the filter discs 1, and the registering inlet passages 5. The inlet pressure then causes the fluid to pass through the walls of the adjacent filter discs 1 into the superimposed outlet cells 4, the suspended solid particles being retained by the walls of the filter discs in the usual manner. The clarified fluid collected in the outlet cells 4 is conducted through the outlet passages 6 and outlet ports 10 to the interior of the cartridge from which it is placed in circulation in the usual manner.

It is to be particularly noted that the continuous exterior and interior walls 7 and 8 of the separator discs 2 make these discs firmly resistant to deformation either by rough handling during assembly or by hydraulic pressure during use, and the reinforcing of the filter discs 1 where they overlie the outlet passages 6 prevents channeling and by-passing of the filter discs even though said discs are constructed of softer and more porous material than hitherto used.

Reference to FIG. 3 of the drawing shows graphically the increased capacity of a filter cartridge constructed according to the present invention as compared with a similar cartridge of present commercial form.

In this figure, curve A shows the rise in pressure in a commercial type of cartridge filter plotted against volume of material entrained in the cartridge. It will be noticed that above the point where the intake pressure reaches twenty-five pounds per square inch, which is the pressure at which replacement of the cartridge is recommended, the pressure stays substantially constant or is even slightly reduced, irrespective of further circulation of turbid fluid. This effect is a result of the channeling action referred to above, and shows the escape of incompletely clarified filtrate.

Curve B was obtained by test of a filter of the same capacity in which the cartridge was constructed as herein disclosed. This curve shows that a considerably greater amount of solid material was retained by the cartridge before the recommended maximum fluid pressure was reached, and the effectiveness of the filter was maintained even though the cartridge was kept in service after the recommended maximum pressure was exceeded.

Although but one form of the present invention has been shown and described in detail, it will be understood that changes may be made in the precise character and form of the structure illustrated without departing from the spirit of the invention.

I claim:

1. A filter cartridge comprising a plurality of filter discs and a plurality of separator discs,
    the filter discs and separator discs being stacked alternately,
    said separator discs having circumferentially arranged cut-out portions forming, with the contiguous filter discs, inlet and outlet cells,
    said outlet cells having outlet passages,
    said outlet cells and passages being walled in by overlying portions of said contiguous filter discs,
    and stiffening inserts bridging said outlet passages for preventing the pressure of the fluid in the inlet cells from forcing the portions of the filter discs, which overlie said outlet passages, down into said passages and thereby forming escape channels from said inlet cells.

2. A filter cartridge as set forth in claim 1 in which said stiffening inserts are embedded in the filter discs in position to bridge the outlet passages in the separator discs.

3. A filter cartridge as set forth in claim 2 in which said stiffening inserts are in the form of staples embracing and clinching the material of the filter discs where it overlies the outlet passages.

4. A filter cartridge comprising a plurality of filter discs of foraminous material, and a plurality of separator discs, the filter discs and separator discs being stacked alternately, said separator discs having circumferentially arranged cut-out portions forming, with the contiguous filter discs, inlet and outlet cells, said outlet cells having outlet passages,
    said inlet cells having radially extending inlet passages terminating a substantial distance from the periphery of the discs, and
    said filter discs having ports registering with the inlet passages of the separator discs for admitting fluid to said inlet passages, and stiffening inserts bridging said outlet passages for preventing the pressure of the fluid in the inlet cells from forcing the portions of the filter discs, which overlie said outlet passages, down into said passages and thereby forming escape channels from said inlet cells.

5. A filter cartridge comprising a plurality of annular filter discs of foraminous material, and
    a plurality of annular separator discs, the filter discs and separator discs being stacked alternately, said separator discs having cut-out portions forming, with the walls of the contiguous filter discs, inlet and outlet cells,
    said outlet cells having outlet passages terminating a substantial distance from the inner periphery of the separator discs, and
    said filter discs having ports registering with said outlet passages for conducting fluid away from said outlet passages, and stiffening inserts bridging said outlet passages for preventing the pressure of the fluid in the inlet cells from forcing the portions of the filter discs, which overlie said outlet passages, down into said passages and thereby forming escape channels from said inlet cells.

References Cited

UNITED STATES PATENTS

| | | |
|---|---|---|
| 2,359,475 | 10/1944 | Gauthier. |
| 2,553,820 | 5/1951 | Gunn _____ 210—492 |
| 2,604,994 | 7/1952 | Vocelka _____ 210—492 |
| 2,687,805 | 8/1954 | Proulx _____ 210—492 |
| 2,856,076 | 10/1958 | Whipple. |

FOREIGN PATENTS

| | | |
|---|---|---|
| 454,897 | 10/1936 | Great Britain. |
| 645,724 | 11/1950 | Great Britain. |
| 710,832 | 6/1954 | Great Britain. |

REUBEN FRIEDMAN, *Primary Examiner.*

D. M. RIESS, *Assistant Examiner.*